United States Patent
Proscia

(10) Patent No.: US 11,365,884 B2
(45) Date of Patent: *Jun. 21, 2022

(54) RADIAL FUEL SHIFTING AND BIASING IN AN AXIAL STAGED COMBUSTOR FOR A GAS TURBINE ENGINE

(71) Applicant: United Technologies Corporation, Farmington, CT (US)

(72) Inventor: William Proscia, Marlborough, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 76 days.

This patent is subject to a terminal disclaimer.

(21) Appl. No.: 16/822,926

(22) Filed: Mar. 18, 2020

(65) Prior Publication Data

US 2020/0217508 A1 Jul. 9, 2020

Related U.S. Application Data

(63) Continuation of application No. 15/283,660, filed on Oct. 3, 2016, now Pat. No. 10,739,003.

(51) Int. Cl.
*F23R 3/14* (2006.01)
*F02C 7/22* (2006.01)
(Continued)

(52) U.S. Cl.
CPC ............. *F23R 3/14* (2013.01); *F02C 7/222* (2013.01); *F02C 7/232* (2013.01); *F23R 3/12* (2013.01); *F23R 3/286* (2013.01); *F23R 3/346* (2013.01); *F23R 3/283* (2013.01); *F23R 3/34* (2013.01); *F23R 3/50* (2013.01)

(58) Field of Classification Search
CPC .... F23R 3/14; F23R 3/286; F23R 3/34; F23R 3/343; F23R 3/346; F02C 7/222; F02C 7/232

See application file for complete search history.

(56) References Cited

U.S. PATENT DOCUMENTS

| | | |
|---|---|---|
| 5,323,614 A | 6/1994 | Tsukahara |
| 5,361,586 A | 11/1994 | McWhirter |

(Continued)

FOREIGN PATENT DOCUMENTS

| | | |
|---|---|---|
| EP | 2940389 A1 | 11/2015 |
| WO | WO2014201135 A1 | 12/2014 |

OTHER PUBLICATIONS

European Search Report dated Feb. 21, 2018 for corresponding EP Application 17194007.5.

(Continued)

*Primary Examiner* — William H Rodriguez
(74) *Attorney, Agent, or Firm* — Bachman & LaPointe, P.C.

(57) ABSTRACT

An injector of a radial fuel injection system for a combustor of a gas turbine engine includes a swirler; and a fuel nozzle located within the swirler, the fuel nozzle located within the swirler, the fuel nozzle operable to provide a biased radial fuel distribution within the swirler. A method of controlling a fuel flow to a combustor of a gas turbine engine includes selectively controlling a biased radial fuel distribution within a swirler of a radial fuel injection system.

17 Claims, 15 Drawing Sheets

(51) Int. Cl.
*F02C 7/232* (2006.01)
*F23R 3/34* (2006.01)
*F23R 3/12* (2006.01)
*F23R 3/28* (2006.01)
*F23R 3/50* (2006.01)

(56) References Cited

U.S. PATENT DOCUMENTS

| | | |
|---|---|---|
| 5,590,529 A | 1/1997 | Joshi et al. |
| 5,647,215 A | 7/1997 | Sharifi |
| 5,749,219 A | 5/1998 | DuBell |
| 5,778,676 A * | 7/1998 | Joshi ................ F23D 11/101 |
| | | 239/405 |
| 5,816,050 A | 10/1998 | Sjunnesson et al. |
| 5,822,992 A * | 10/1998 | Dean ................ F23R 3/286 |
| | | 60/737 |
| 5,983,643 A | 11/1999 | Kiesow |
| 6,058,710 A | 5/2000 | Brehm |
| 6,141,967 A * | 11/2000 | Angel ................ F23R 3/14 |
| | | 239/405 |
| 6,381,964 B1 | 5/2002 | Pritchard |
| 6,412,282 B1 | 7/2002 | Willis |
| 6,530,223 B1 | 3/2003 | Dodds et al. |
| 6,705,087 B1 * | 3/2004 | Ohri ................ F23R 3/14 |
| | | 60/748 |
| 6,868,676 B1 | 3/2005 | Haynes |
| 8,176,739 B2 | 5/2012 | Evulet et al. |
| 8,220,269 B2 | 7/2012 | Poyyapakkam |
| 8,220,271 B2 | 7/2012 | Poyyapakkam et al. |
| 8,640,464 B2 | 2/2014 | Condevaux et al. |
| 8,656,721 B2 | 2/2014 | Matsumoto et al. |
| 8,739,543 B2 | 6/2014 | Deuker et al. |
| 8,893,467 B2 | 11/2014 | Nalim et al. |
| 9,057,523 B2 | 6/2015 | Cunha et al. |
| 9,068,748 B2 | 6/2015 | Hoke |
| 9,194,586 B2 | 11/2015 | Hawie et al. |
| 9,243,802 B2 | 1/2016 | Hawie et al. |
| 9,328,924 B2 | 5/2016 | Condevaux et al. |
| 9,388,987 B2 | 7/2016 | Valeev et al. |
| 10,393,030 B2 * | 8/2019 | Proscia ................ F23R 3/343 |
| 10,508,811 B2 * | 12/2019 | Proscia ................ F23R 3/346 |
| 10,739,003 B2 * | 8/2020 | Proscia ................ F23R 3/14 |
| 2004/0025508 A1 | 2/2004 | Calvez et al. |
| 2007/0271927 A1 | 11/2007 | Myers |
| 2008/0098736 A1 | 5/2008 | Lee et al. |
| 2008/0289341 A1 | 11/2008 | Ishizaka |
| 2009/0113893 A1 | 5/2009 | Li |
| 2010/0174466 A1 | 7/2010 | Davis, Jr |
| 2010/0229557 A1 | 9/2010 | Matsumoto |
| 2010/0263382 A1 | 10/2010 | Mancini |
| 2010/0269508 A1 * | 10/2010 | Saito ................ F23R 3/14 |
| | | 60/748 |
| 2011/0113787 A1 | 5/2011 | Milosavljevic |
| 2012/0305673 A1 | 12/2012 | Matsuyama et al. |
| 2013/0104554 A1 | 5/2013 | Bode |
| 2013/0125556 A1 | 5/2013 | Hoke et al. |
| 2013/0174558 A1 | 7/2013 | Stryapunin |
| 2014/0000264 A1 | 1/2014 | Saito |
| 2015/0159877 A1 | 6/2015 | Stoia |
| 2015/0184858 A1 | 7/2015 | Stuttaford et al. |
| 2015/0285501 A1 | 10/2015 | DiCintio |
| 2016/0305327 A1 | 10/2016 | Patel |
| 2017/0045231 A1 | 2/2017 | Stevenson et al. |
| 2017/0159938 A1 * | 6/2017 | Barnhart ................ F23R 3/34 |
| 2017/0298875 A1 * | 10/2017 | Patel ................ F02M 61/14 |
| 2017/0299190 A1 * | 10/2017 | Patel ................ F23R 3/286 |
| 2019/0257521 A1 * | 8/2019 | Sadasivuni ................ F02C 7/22 |
| 2020/0325831 A1 * | 10/2020 | Tsunoda ................ F02C 7/232 |
| 2020/0326073 A1 * | 10/2020 | Kim ................ F23R 3/14 |

OTHER PUBLICATIONS

European Search Report dated Oct. 28, 2021 issued on European Patent Application No. 21180994.2.

* cited by examiner

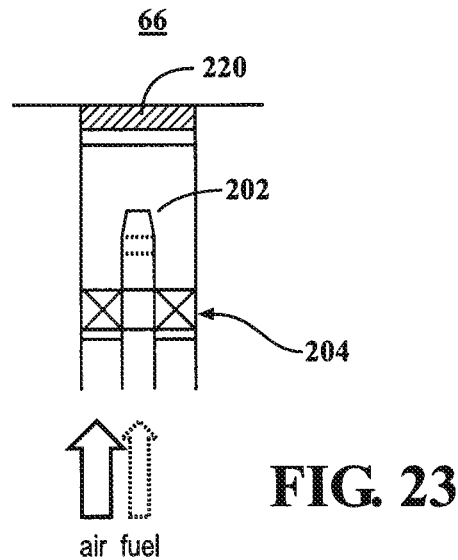 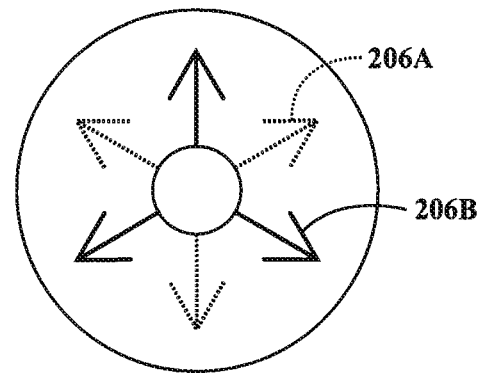
FIG. 23  FIG. 24
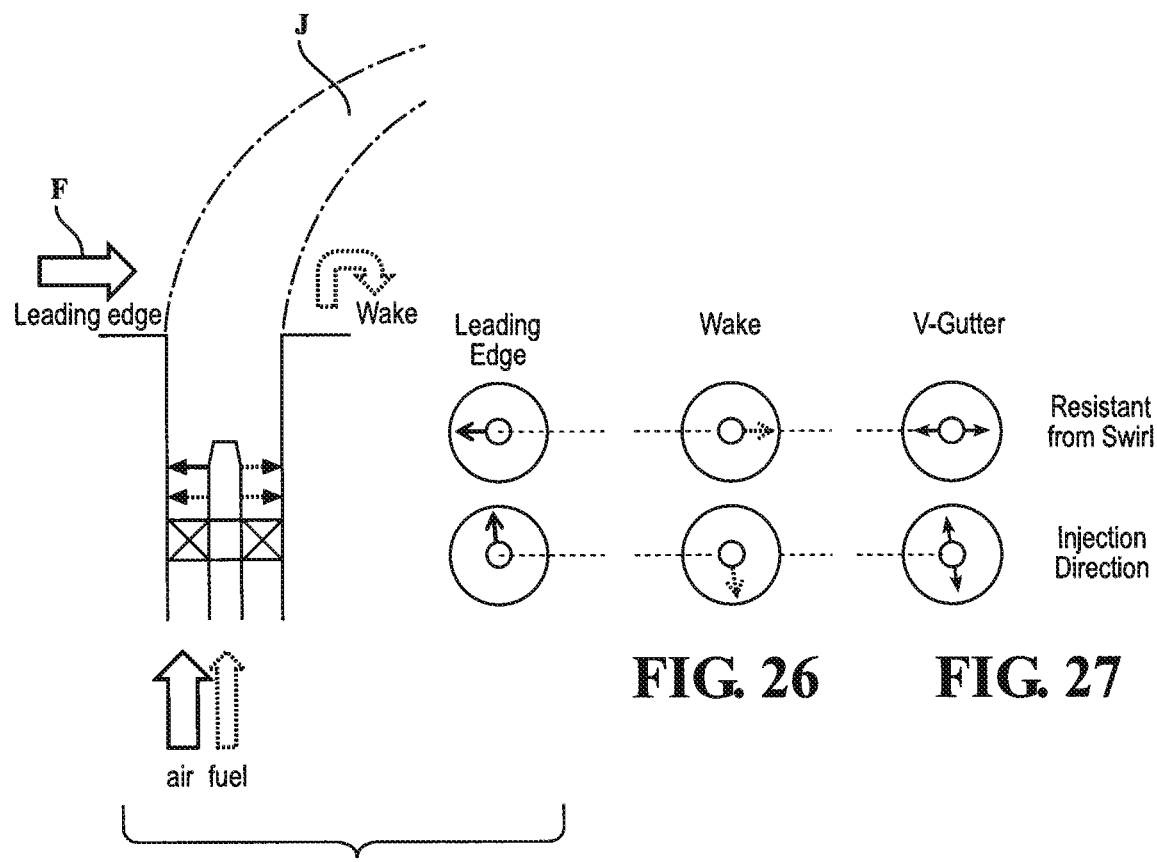
FIG. 25  FIG. 26  FIG. 27

RADIAL FUEL SHIFTING AND BIASING IN AN AXIAL STAGED COMBUSTOR FOR A GAS TURBINE ENGINE

CROSS-REFERENCE TO RELATED APPLICATION

This application is a continuation of U.S. patent application Ser. No. 15/283,660, filed Oct. 3, 2016.

BACKGROUND

The present disclosure relates to a gas turbine engine and, more particularly, to a combustor section therefor.

Gas turbine engines, such as those which power modern commercial and military aircrafts, include a compressor for pressurizing a supply of air, a combustor for burning a hydrocarbon fuel in the presence of the pressurized air, and a turbine for extracting energy from the resultant combustion gases. The combustor generally includes radially spaced apart inner and outer liners that define an annular combustion chamber therebetween. Arrays of circumferentially distributed combustion air holes penetrate multiple axial locations along each liner to radially admit the pressurized air into the combustion chamber. A plurality of circumferentially distributed fuel injector orifices axially project into a forward section of the combustion chamber to supply the fuel for mixing with the pressurized air.

Combustion of hydrocarbon fuel in the presence of pressurized air may produce nitrogen oxide (NOX) emissions that are subject to excessively stringent controls by regulatory authorities, and thus may be sought to be minimized. Lean-staged liquid-fueled aeroengine combustors can provide low NOx and particulate matter emissions, but are also prone to combustion instabilities. There are several mechanism that may cause combustion instabilities in radial-staged lean combustors including heat release concentrated in the front of the combustor, and weak flame holding at certain operating conditions where main stage air dilutes the pilot stage fuel-air ratio.

SUMMARY

An injector of a radial fuel injection system for a combustor of a gas turbine engine according to one disclosed non-limiting embodiment of the present disclosure can include a swirler and a fuel nozzle located within the swirler, the fuel nozzle operable to provide a biased radial fuel distribution within the swirler.

A further embodiment of the present disclosure may include, wherein the biased radial fuel distribution within the swirler provides a fuel bias to fuel enrich a radial location with respect to an exit diameter of the swirler.

A further embodiment of the present disclosure may include, wherein the biased radial fuel distribution within the swirler provides a fuel enriched bias to fuel enrich an outer portion of the jet with respect to an exit diameter of the swirler.

A further embodiment of the present disclosure may include, wherein the biased radial fuel distribution within the swirler provides a fuel enriched bias to fuel enrich a jet leading edge with respect to a cross-flow of hot combustion products from an upstream pilot zone.

A further embodiment of the present disclosure may include, wherein the biased radial fuel distribution within the swirler provides a fuel enriched bias with respect to fuel enrich a wake with respect to a cross-flow of hot combustion products from an upstream pilot zone.

A further embodiment of the present disclosure may include, wherein the biased radial fuel distribution within the swirler provides a fuel enriched bias with respect to a flameholder.

A further embodiment of the present disclosure may include, wherein the fuel nozzle includes a first set of fuel injector orifices and a second set of fuel injector orifices in the fuel nozzle, the second set of fuel injector orifices downstream of the first set of fuel injector orifices with respect to the swirler.

A further embodiment of the present disclosure may include a first fuel manifold in communication with the first set of fuel injector orifices and a second fuel manifold in communication with the second set of fuel injector orifices.

A further embodiment of the present disclosure may include a fuel divider valve that selectively communicates a respective percentage of fuel flow to the first set of fuel injector orifices and the second set of fuel injector orifices to provide a selective flow split between the first set of fuel injector orifices and the second set of fuel injector orifices.

A further embodiment of the present disclosure may include, wherein the fuel divider valve is mechanical.

A further embodiment of the present disclosure may include, wherein the fuel divider valve is electrical.

An injector of a radial fuel injection system for a combustor of a gas turbine engine according to one disclosed non-limiting embodiment of the present disclosure can include a swirler and a fuel nozzle located within the swirler, the fuel nozzle includes a first set of fuel injector orifices and a second set of fuel injector orifices, the second set of fuel injector orifices downstream of the first set of fuel injector orifices with respect to the swirler, at least one of the sets of fuel injector orifices arranged to provide a biased radial fuel distribution within the swirler.

A further embodiment of the present disclosure may include, wherein at least one of the sets of fuel injector orifices is arranged to provide a fuel enriched bias to fuel enrich a radial location with respect to an exit diameter of the swirler.

A further embodiment of the present disclosure may include, wherein at least one of the sets of fuel injector orifices is arranged to provide a fuel enriched bias to fuel enrich an outer portion of the jet with respect to an exit diameter of the swirler.

A further embodiment of the present disclosure may include, wherein at least one of the sets of fuel injector orifices is arranged to provide a fuel enriched bias to fuel enrich a jet leading edge from the swirler with respect to a cross-flow of hot combustion products from an upstream pilot zone.

A further embodiment of the present disclosure may include, wherein at least one of the sets of fuel injector orifices is arranged to provide a fuel enriched bias with respect to fuel enrich a wake from the swirler with respect to a cross-flow of hot combustion products from an upstream pilot zone.

A further embodiment of the present disclosure may include, wherein at least one of the sets of fuel injector orifices is arranged to provide a fuel enriched bias with respect to a flameholder.

A further embodiment of the present disclosure may include a first fuel manifold in communication with the first set of fuel injector orifices and a second fuel manifold in communication with the second set of fuel injector orifices.

A further embodiment of the present disclosure may include a fuel divider valve that selectively communicates a respective percentage of fuel flow to the first set of fuel injector orifices and the second set of fuel injector orifices to provide a selective flow split between the first set of fuel injector orifices and the second set of fuel injector orifices.

A further embodiment of the present disclosure may include, wherein the fuel divider valve is at least one of a mechanical or electrical divider valve.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 23 is a schematic view of a fuel injector of a radial fuel injection system with a flameholder according to one disclosed non-limiting embodiment;

FIG. 24 is a schematic view of a fuel orifice arrangement according to one disclosed non-limiting embodiment;

FIG. 25 is a schematic view of a fuel orifice arrangement according to one disclosed non-limiting embodiment;

FIG. 26 is a schematic view of a fuel orifice arrangement according to one disclosed non-limiting embodiment;

FIG. 27 is a schematic view of a fuel orifice arrangement according to one disclosed non-limiting embodiment;

DETAILED DESCRIPTION

Figure 1:
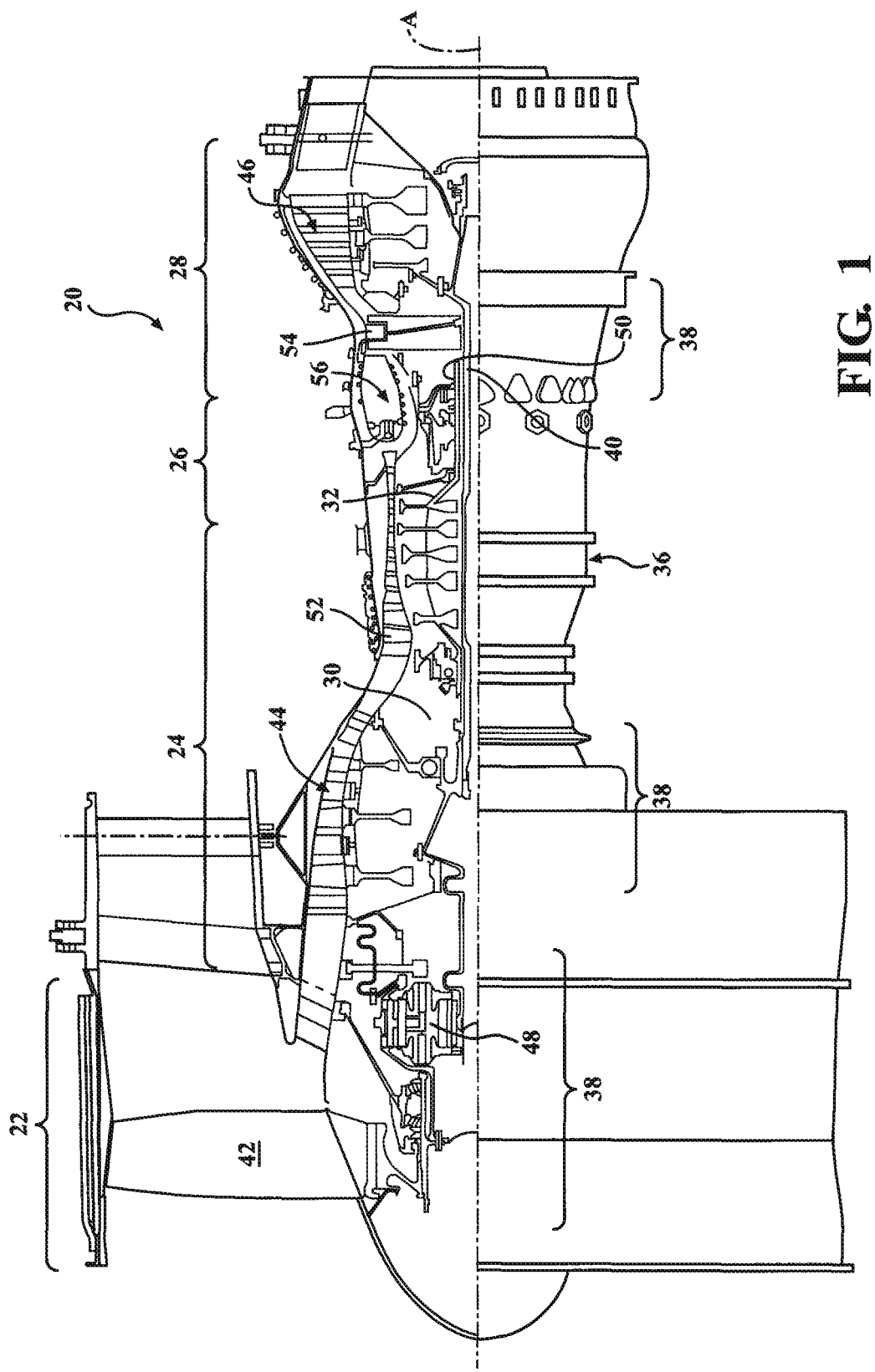
FIG. 1 is a schematic cross-section of an example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an intermediate pressure turbine ("IPT") between the high pressure turbine ("HPT") and the Low pressure Turbine ("LPT").

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The turbines 54, 46 rotationally drive the respective low spool 30 and high spool 32 in response to the expansion. The main engine shafts 40, 50 are supported at a plurality of points by bearing structures 38 within the static structure 36. It should be understood that various bearing structures 38 at various locations may alternatively or additionally be provided.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3, and in another example is greater than about 2.5:1. The geared turbofan enables operation of the low spool 30 at higher speeds which can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

In one embodiment, a significant amount of thrust is provided by the bypass flow path due to the high bypass ratio. The fan section 22 of the gas turbine engine 20 is designed for a particular flight condition—typically cruise at about 0.8 Mach and about 35,000 feet (10668 m). This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("Tram"/518.7)$^{0.5}$. The Low Corrected Fan Tip Speed according to one non-limiting embodiment of the example gas turbine engine 20 is less than about 1150 fps (351 m/s).

Figure 2:
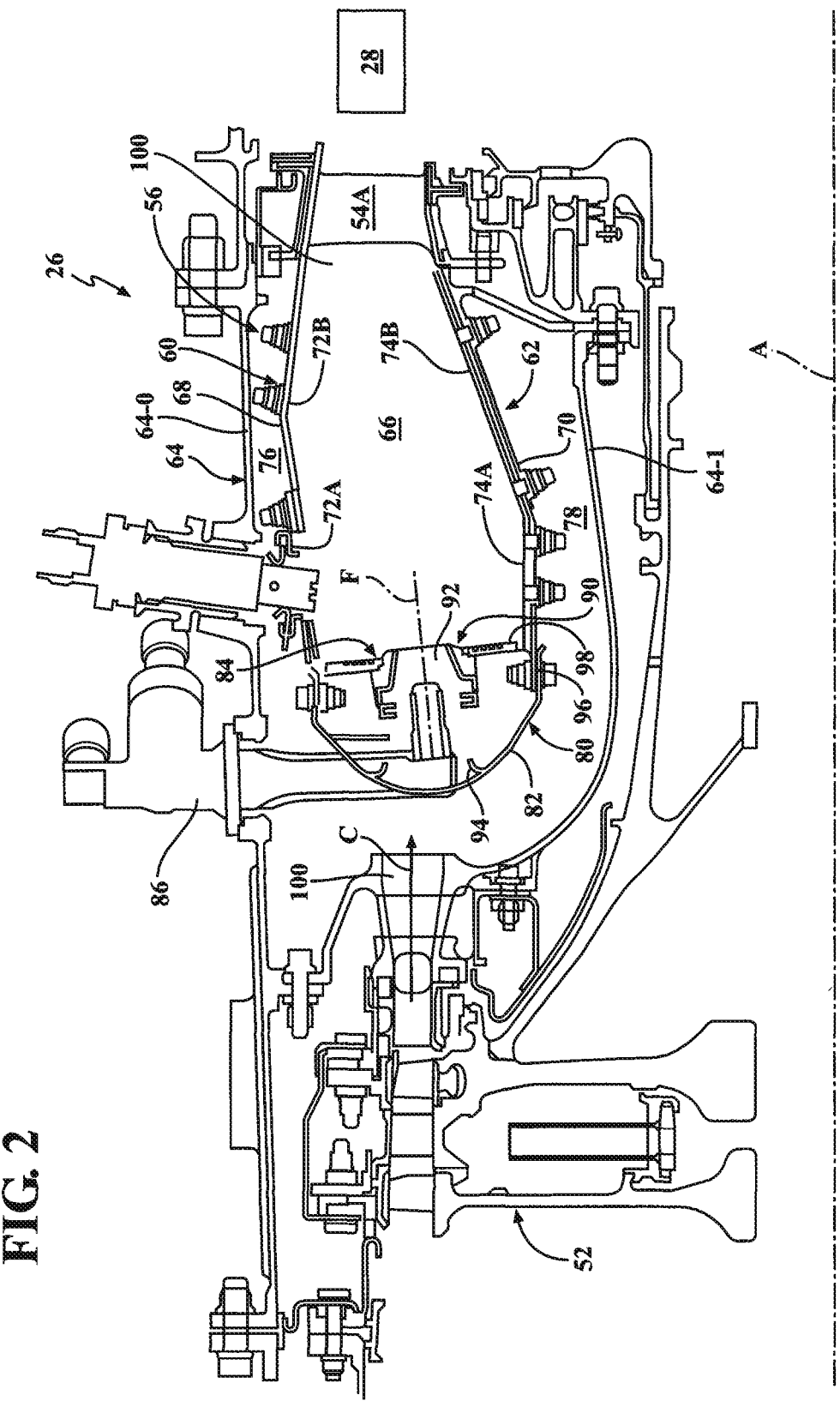
FIG. 2 is an expanded longitudinal schematic sectional view of a combustor section according to one non-limiting embodiment that may be used with the example gas turbine engine

With reference to FIG. 2, the combustor section 26 generally includes a combustor 56 with an outer combustor liner assembly 60, an inner combustor liner assembly 62 and a diffuser case module 64. The outer combustor liner assembly 60 and the inner combustor liner assembly 62 are spaced apart such that a combustion chamber 66 is defined therebetween. The combustion chamber 66 is generally annular in shape.

The outer combustor liner assembly 60 is spaced radially inward from an outer diffuser case 64-O of the diffuser case module 64 to define an outer annular plenum 76. The inner combustor liner assembly 62 is spaced radially outward from an inner diffuser case 64-I of the diffuser case module 64 to define an inner annular plenum 78. It should be understood that although a particular combustor is illustrated, other combustor types with various combustor liner arrangements will also benefit herefrom. It should be further understood that the disclosed cooling flow paths are but an illustrated embodiment and should not be limited only thereto.

The combustor liner assemblies 60, 62 contain the combustion products for direction toward the turbine section 28. Each combustor liner assembly 60, 62 generally includes a respective support shell 68, 70 which supports one or more liner panels 72, 74 mounted to a hot side of the respective support shell 68, 70. Each of the liner panels 72, 74 may be generally rectilinear and manufactured of, for example, a nickel based super alloy, ceramic or other temperature resistant material and are arranged to form a liner array. In one disclosed non-limiting embodiment, the liner array includes a multiple of forward liner panels 72A and a multiple of aft liner panels 72B that are circumferentially staggered to line the hot side of the outer shell 68 (also shown in FIG. 3). A multiple of forward liner panels 74A and a multiple of aft liner panels 74B are circumferentially staggered to line the hot side of the inner shell 70 (also shown in FIG. 3).

The combustor 56 further includes a forward assembly 80 immediately downstream of the compressor section 24 to receive compressed airflow therefrom. The forward assembly 80 generally includes an annular hood 82, a bulkhead assembly 84, a multiple of forward fuel nozzles 86 (one shown) and a multiple of swirlers 90 (one shown). The multiple of fuel nozzles 86 (one shown) and the multiple of swirlers 90 (one shown) define an axial pilot fuel injection system 92 that directs the fuel-air mixture into the combustor chamber generally along an axis F.

The bulkhead assembly 84 includes a bulkhead support shell 96 secured to the combustor liner assemblies 60, 62, and a multiple of circumferentially distributed bulkhead liner panels 98 secured to the bulkhead support shell 96. The annular hood 82 extends radially between, and is secured to, the forwardmost ends of the combustor liner assemblies 60, 62. The annular hood 82 includes a multiple of circumferentially distributed hood ports 94 that accommodate the respective forward fuel nozzles 86 and direct air into the forward end of the combustion chamber 66 through a respective swirler 90. Each forward fuel nozzle 86 may be secured to the diffuser case module 64 and project through one of the hood ports 94 and through the respective swirler 90. Each of the fuel nozzles 86 is directed through the respective swirler 90 and the bulkhead assembly 84 along a respective axis F.

The forward assembly 80 introduces core combustion air into the forward section of the combustion chamber 66 while the remainder enters the outer annular plenum 76 and the inner annular plenum 78. The multiple of fuel nozzles 86 and adjacent structure generate a blended fuel-air mixture that supports stable combustion in the combustion chamber 66.

Opposite the forward assembly 80, the outer and inner support shells 68, 70 are mounted to a first row of Nozzle Guide Vanes (NGVs) 54A in the HPT 54 to define a combustor exit 100. The NGVs 54A are static engine components which direct core airflow combustion gases onto the turbine blades of the first turbine rotor in the turbine section 28 to facilitate the conversion of pressure energy into kinetic energy. The combustion gases are also accelerated by the NGVs 54A because of their convergent shape and are typically given a "spin" or a "swirl" in the direction of turbine rotor rotation. The turbine rotor blades absorb this energy to drive the turbine rotor at high speed.

Figure 3:
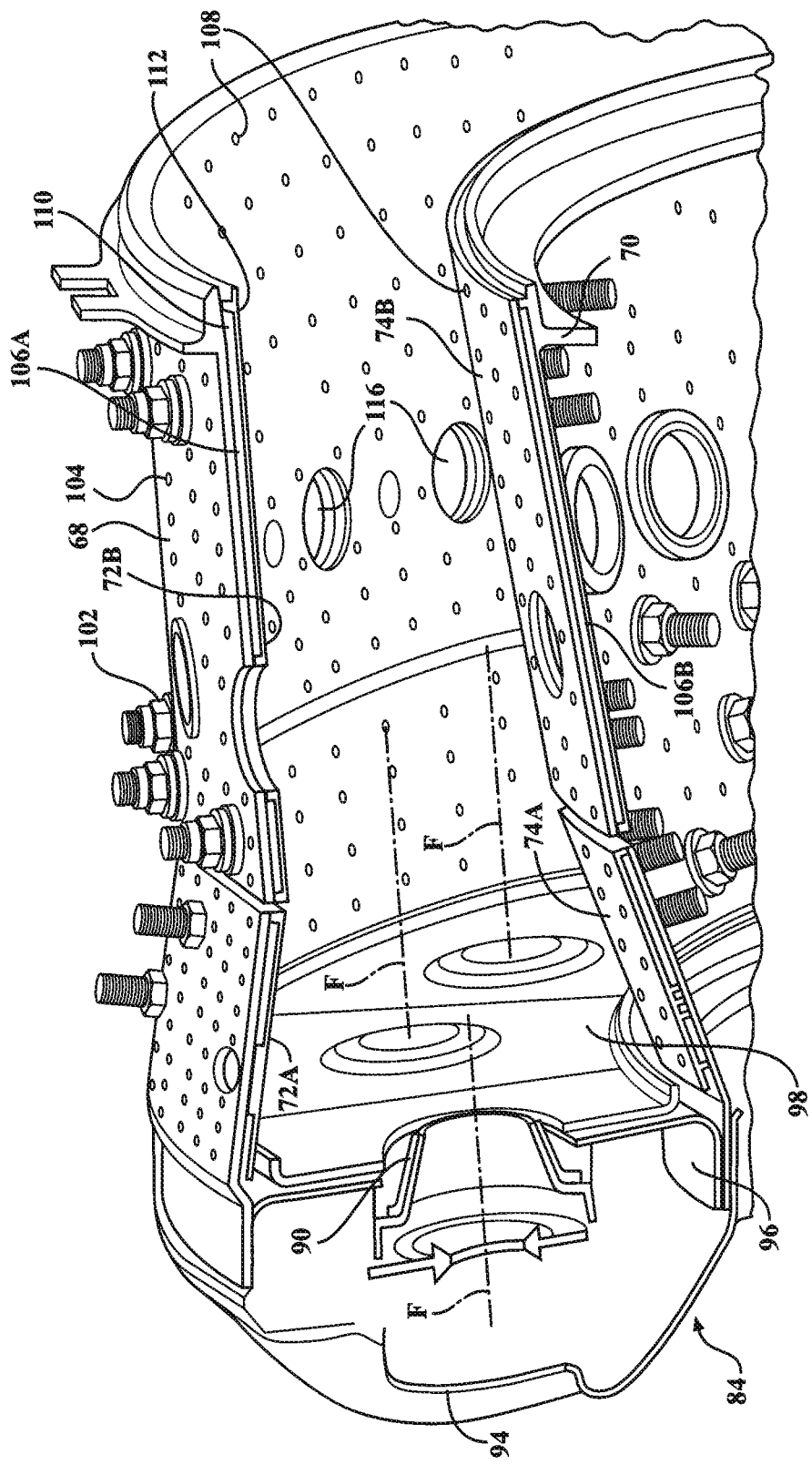
FIG. 3 is a perspective partial longitudinal sectional view of the combustor section.

With reference to FIG. 3, a multiple of cooling impingement holes 104 penetrate through the support shells 68, 70 to allow air from the respective annular plenums 76, 78 to enter cavities 106A, 106B formed in the combustor liner assemblies 60, 62 between the respective support shells 68, 70 and liner panels 72, 74. The cooling impingement holes 104 are generally normal to the surface of the liner panels 72, 74. The air in the cavities 106A, 106B provides cold side impingement cooling of the liner panels 72, 74 that is generally defined herein as heat removal via internal convection.

A multiple of cooling film holes 108 penetrate through each of the liner panels 72, 74. The geometry of the film holes, e.g., diameter, shape, density, surface angle, incidence angle, etc., as well as the location of the holes with respect to the high temperature main flow also contributes to effusion film cooling. The liner panels 72, 74 with a combination of impingement holes 104 and film holes 108 may sometimes be referred to as an Impingement Film Floatliner assembly. It should be appreciated that other liner panel assemblies inclusive of a single panel.

The cooling film holes 108 allow the air to pass from the cavities 106A, 106B defined in part by a cold side 110 of the liner panels 72, 74 to a hot side 112 of the liner panels 72, 74 and thereby facilitate the formation of a film of cooling air along the hot side 112. The cooling film holes 108 are generally more numerous than the impingement holes 104 to promote the development of a film cooling along the hot side 112 to sheath the liner panels 72, 74. Film cooling as defined herein is the introduction of a relatively cooler airflow at one or more discrete locations along a surface exposed to a high temperature environment to protect that surface in the immediate region of the airflow injection as well as downstream thereof.

A multiple of dilution holes 116 may penetrate through both the respective support shells 68, 70 and liner panels 72, 74 along a common axis downstream of the forward assembly 80 to quench the hot gases by supplying cooling air radially into the combustor. That is, the multiple of dilution holes 116 provide a direct path for airflow from the annular plenums 76, 78 into the combustion chamber 66.

Figure 4:
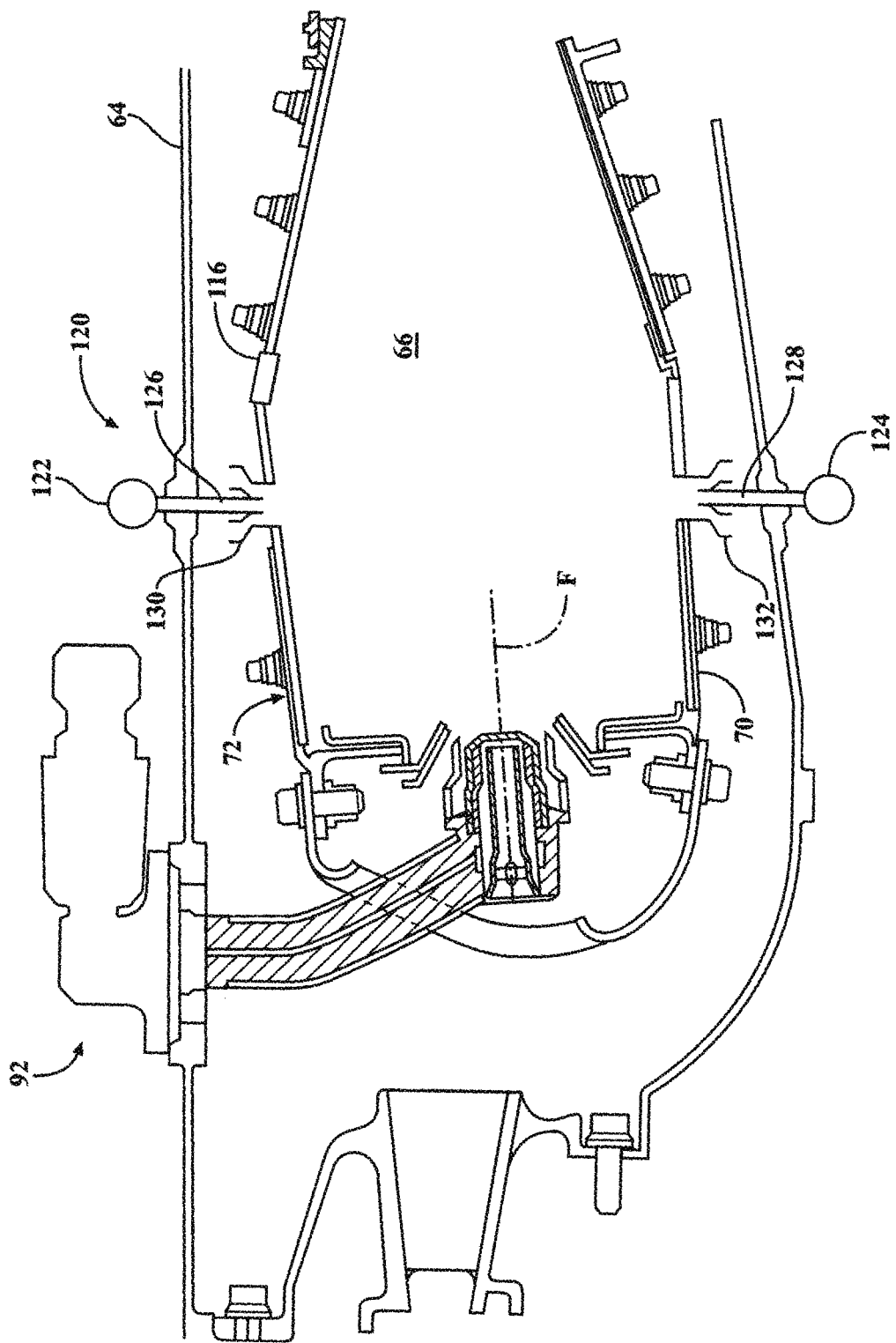
FIG. 4 is a schematic longitudinal sectional view of the combustor section which illustrates a forward axial fuel injection system and a downstream radial fuel injections system according to one disclosed non-limiting embodiment.

With reference to FIG. 4, a radial main fuel injection system 120 communicates with the combustion chamber 66 downstream of the axial pilot fuel injection system 92 generally transverse to axis F of an Axially Controlled Stoichiometry (ACS) Combustor. The radial main fuel injection system 120 introduces a portion of the fuel required for desired combustion performance, e.g., emissions, operability, durability, as well as to lean-out the fuel contribution provided by the axial pilot fuel injection system 92. In one disclosed non-limiting embodiment, the radial main fuel injection system 120 is positioned downstream of the axial pilot fuel injection system 92 and upstream of the multiple of dilution holes 116.

The radial main fuel injection system 120 generally includes a radially outer fuel injection manifold 122 (illustrated schematically) and/or a radially inner fuel injection manifold 124 (illustrated schematically) with a respective multiple of outer fuel nozzles 126 and a multiple of inner fuel nozzles 128. The radially outer fuel injection manifold 122 and/or a radially inner fuel injection manifold 124 may be mounted to the diffuser case module 64 and/or to the shell 68, 70, however, various mount arrangements may alternatively or additionally provided.

Each of the multiple of outer and inner fuel nozzles 126, 128 are located within a respective mixer 130, 132 to mix the supply of fuel into the pressurized air within the diffuser case module 64. As defined herein, a "mixer" as compared to a "swirler" may generate, for example, zero swirl, a counter-rotating swirl, a specific swirl which provides a resultant swirl or a residual net swirl which may be further directed at an angle. It should be appreciated that various combinations thereof may alternatively be utilized.

The radial main fuel injection system 120 may include only the radially outer fuel injection manifold 96 with the multiple of outer fuel nozzles 126; only the radially inner fuel injection manifold 124 with the multiple of inner fuel nozzles 128; or both (shown). It should be appreciated that the radial main fuel injection system 120 may include single sets of outer fuel nozzles 126 and inner fuel nozzles 128 (shown) or multiple axially distributed sets of, for example, relatively smaller fuel nozzles.

Figure 5:
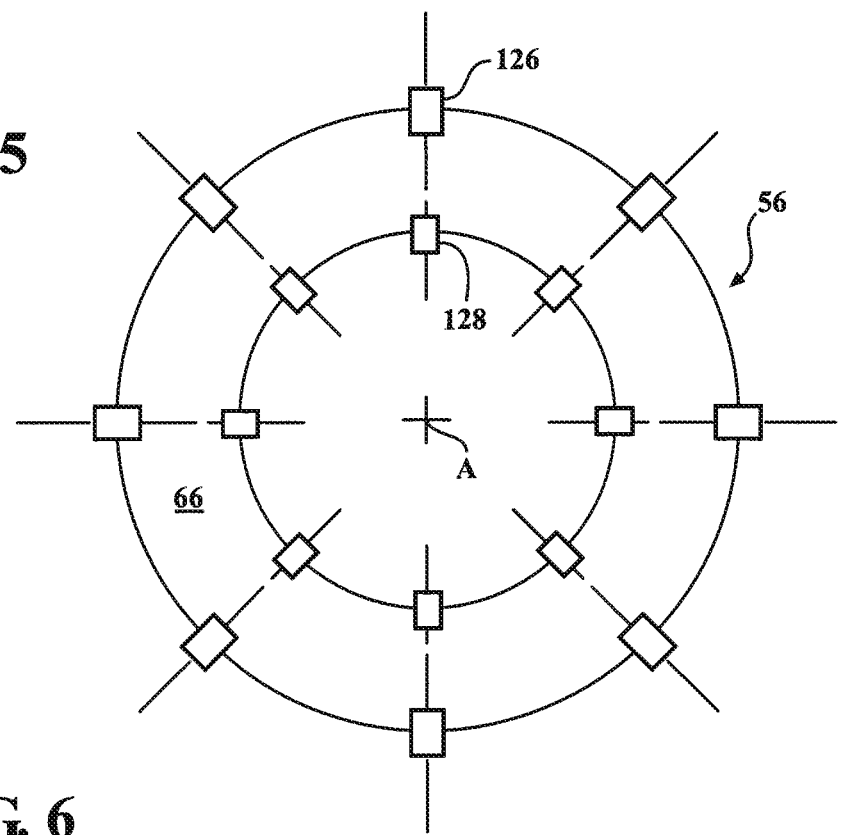
FIG. 5 is a schematic lateral sectional view of a combustor which illustrates an in-line fuel nozzle arrangement according to another disclosed non-limiting embodiment.
Figure 6:
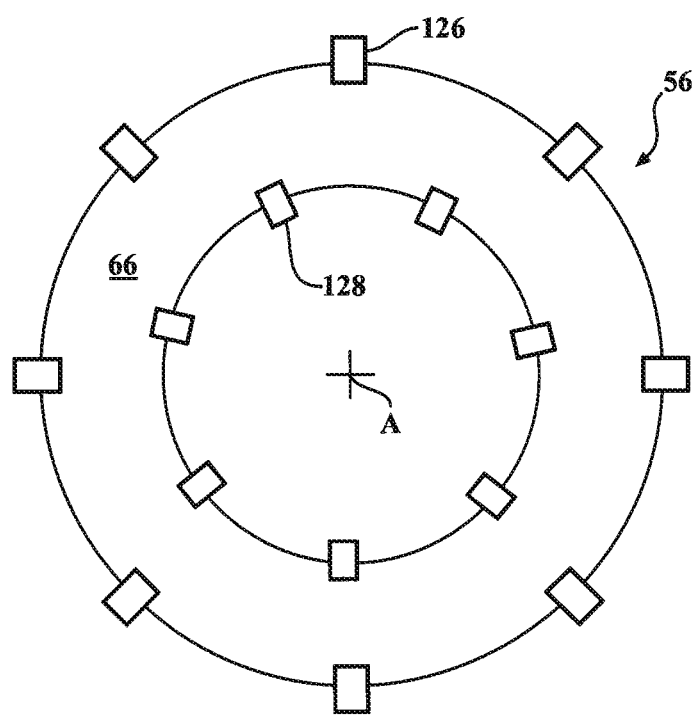
FIG. 6 is a schematic lateral sectional view of a combustor which illustrates a clocked fuel nozzle arrangement according to another disclosed non-limiting embodiment.
Figure 7:
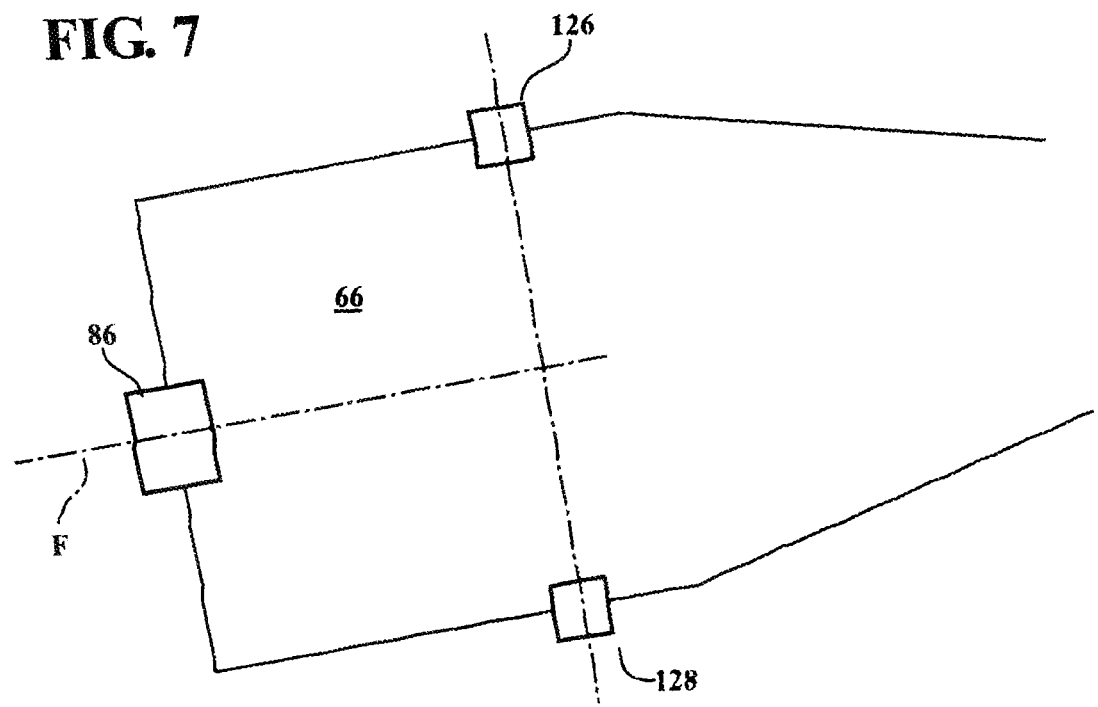
FIG. 7 is a schematic longitudinal sectional view of a combustor which illustrates a tangential fuel nozzle arrangement according to another disclosed non-limiting embodiment.
Figure 8:
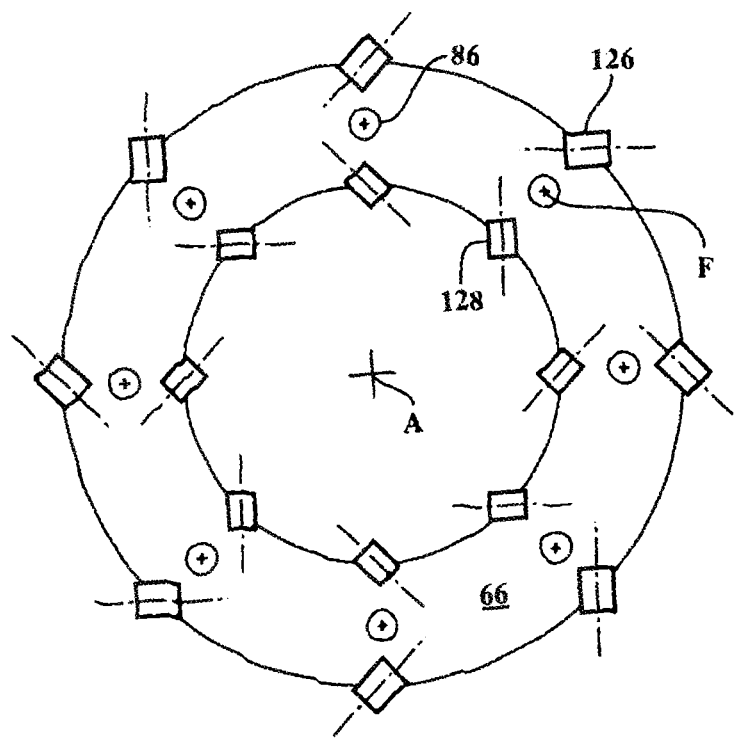
FIG. 8 is a schematic lateral sectional view of a combustor which illustrates a tangential fuel nozzle arrangement according to another disclosed non-limiting embodiment.
Figure 9:
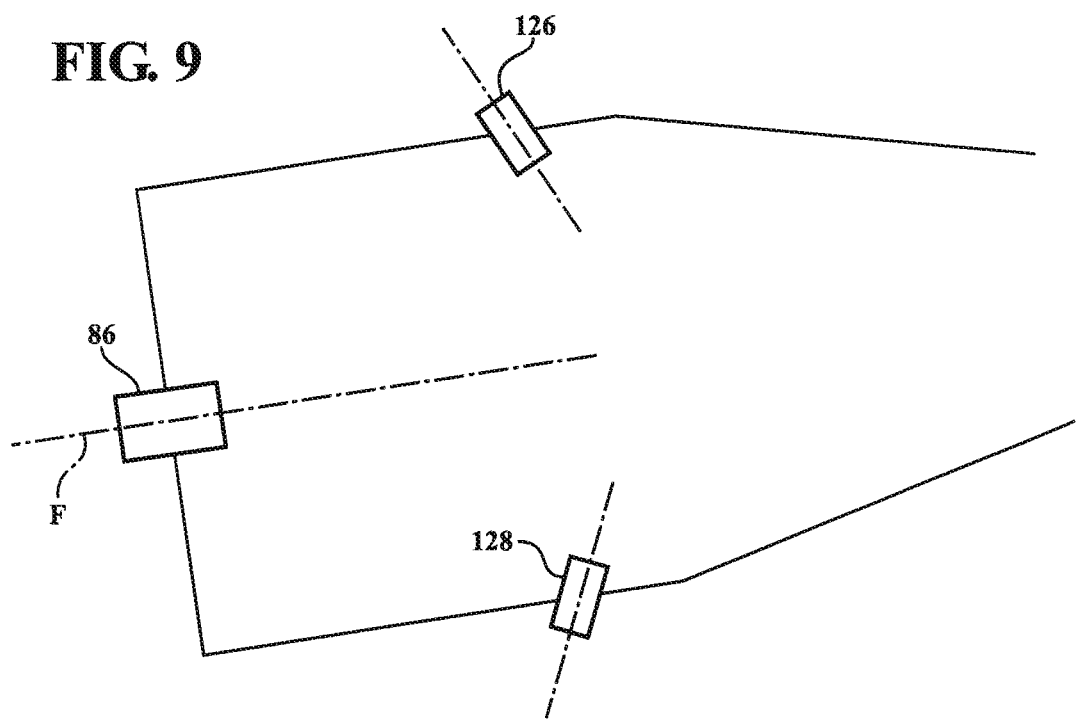
FIG. 9 is a schematic longitudinal sectional view of a combustor which illustrates an axially angled fuel nozzle arrangement according to another disclosed non-limiting embodiment.

The radial main fuel injection system 120 may be circumferentially arranged in a multiple of configurations. In one disclosed non-limiting embodiment, the multiple of outer fuel nozzles 126 and the multiple of inner fuel nozzles 128 are circumferentially arranged so that the nozzles 126, 128 are directly opposed (FIG. 5). In another disclosed non-limiting embodiment, the multiple of outer fuel nozzles 126 and the multiple of inner fuel nozzles 128 are circumferentially staggered so that the nozzles 126, 128 are not directly opposed (FIG. 6). Furthermore, the nozzles 126, 128 may be angled perpendicularly (FIG. 8), tangentially (FIG. 8), or at an angle such as downstream (FIG. 9) relative to the cross flow from the fuel nozzles 86 of the axial pilot fuel injection system 92 that are directed along axis F.

Figure 10:
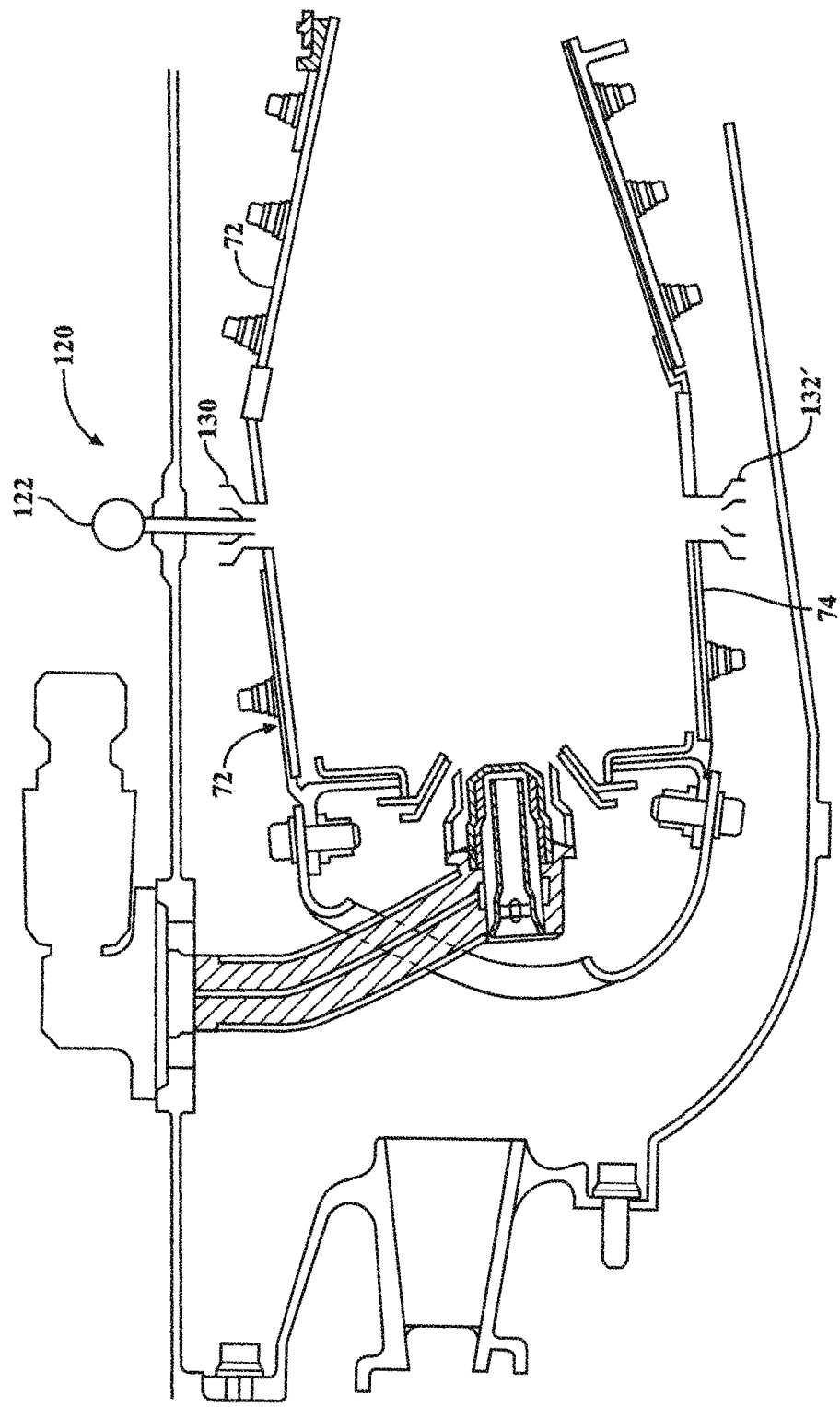
FIG. 10 is a schematic longitudinal sectional view of a combustor which illustrates an outer radial fuel injection system arrangement according to another disclosed non-limiting embodiment.
Figure 12:
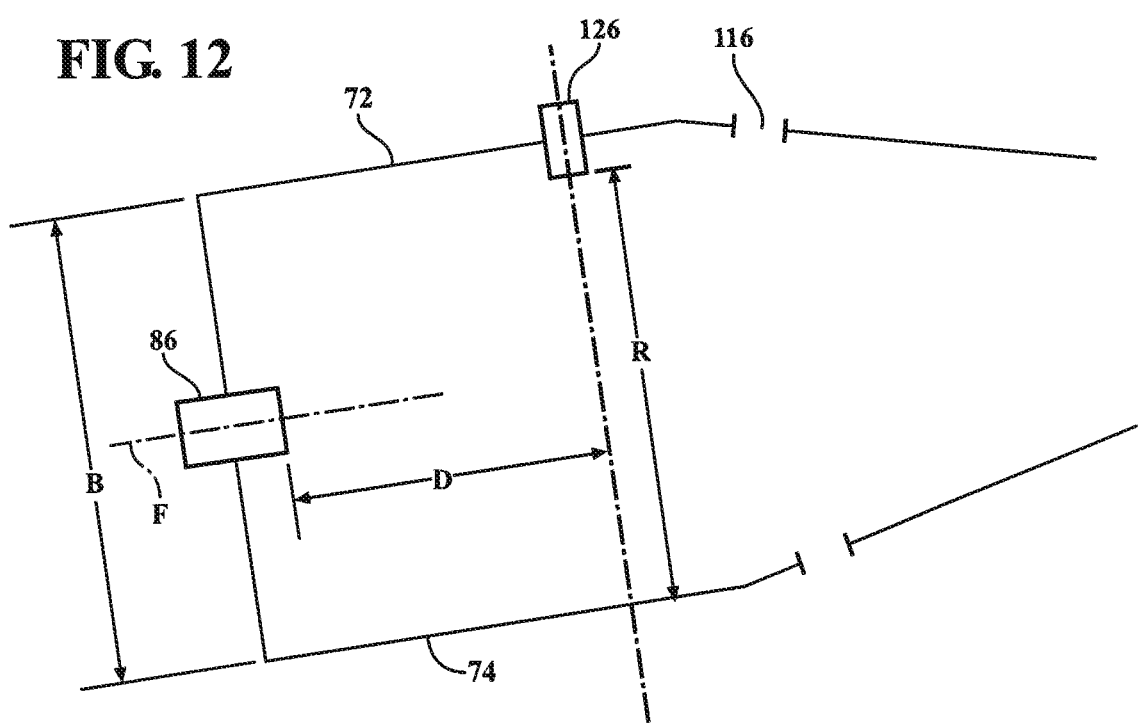
FIG. 12 is a schematic longitudinal sectional view of a combustor which illustrates a relationship between the axial and radial fuel injection systems according to another disclosed non-limiting embodiment.

Alternatively still, the multiple of outer fuel nozzles 126 may be positioned through the outer liner 72 opposite or staggered relative to a non-fueled mixer 132' on the inner liner 74 (FIG. 10). That is, the non-fueled mixer 132' provides airflow but not fuel.

The lean-staging is accomplished by axially distributing the fuel injection with a front-end pilot injector and a downstream main injector to axially distribute the heat release similar to an RQL designs, but with lean/lean combustion to enable low NOx and PM emissions. This is different than radial staged designs where all the fuel is injected at the front-end of the combustor. Moving the heat release away from the front-end which can be a pressure anti-node for longitudinal acoustic modes to decrease coupling with these modes.

Figure 11:
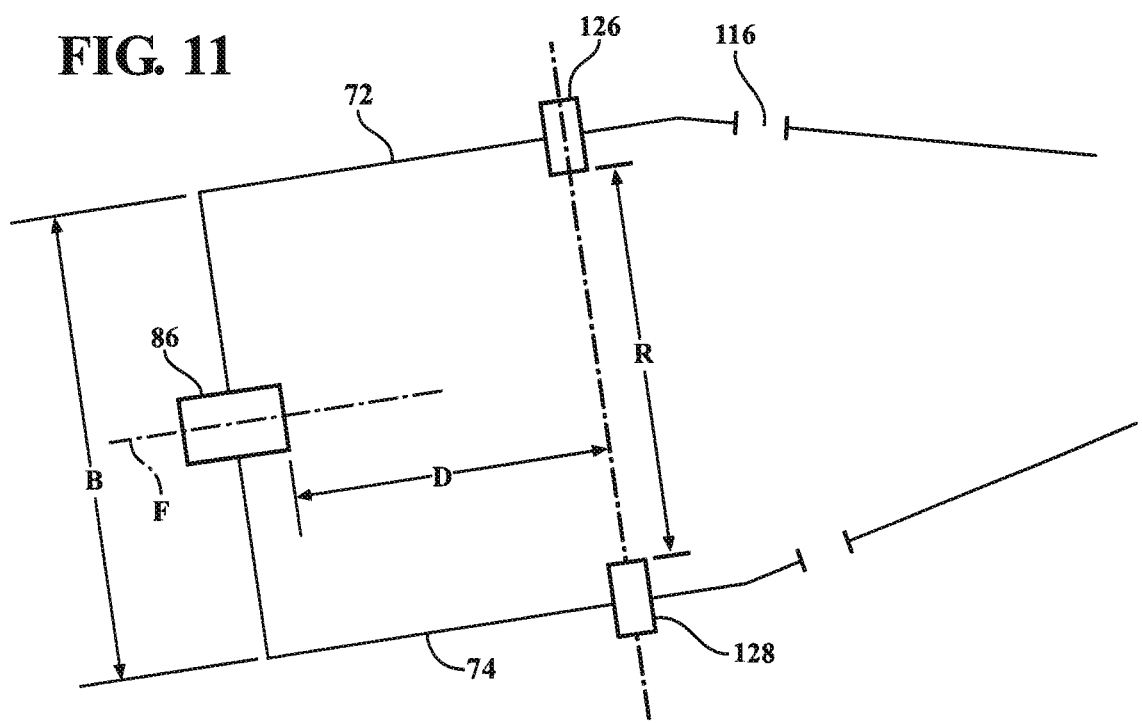
FIG. 11 is a schematic longitudinal sectional view of a combustor which illustrates a relationship between the axial and radial fuel injection systems according to another disclosed non-limiting embodiment.

With respect to FIG. 11, the forward fuel nozzles 86 are circumferentially spaced apart between about 80%-200% of a bulkhead height B. The bulkhead height B as defined herein is the radial distance between the liner panels 72, 74 at the forward end of the combustion chamber 66 at the bulkhead liner panels 98 of bulkhead assembly 84. The multiple of outer fuel nozzles 126 and the inner fuel nozzles 128 are axially spaced a distance D between 50%-150% of the bulkhead height B aft of the forward fuel nozzles 86.

Figure 13:
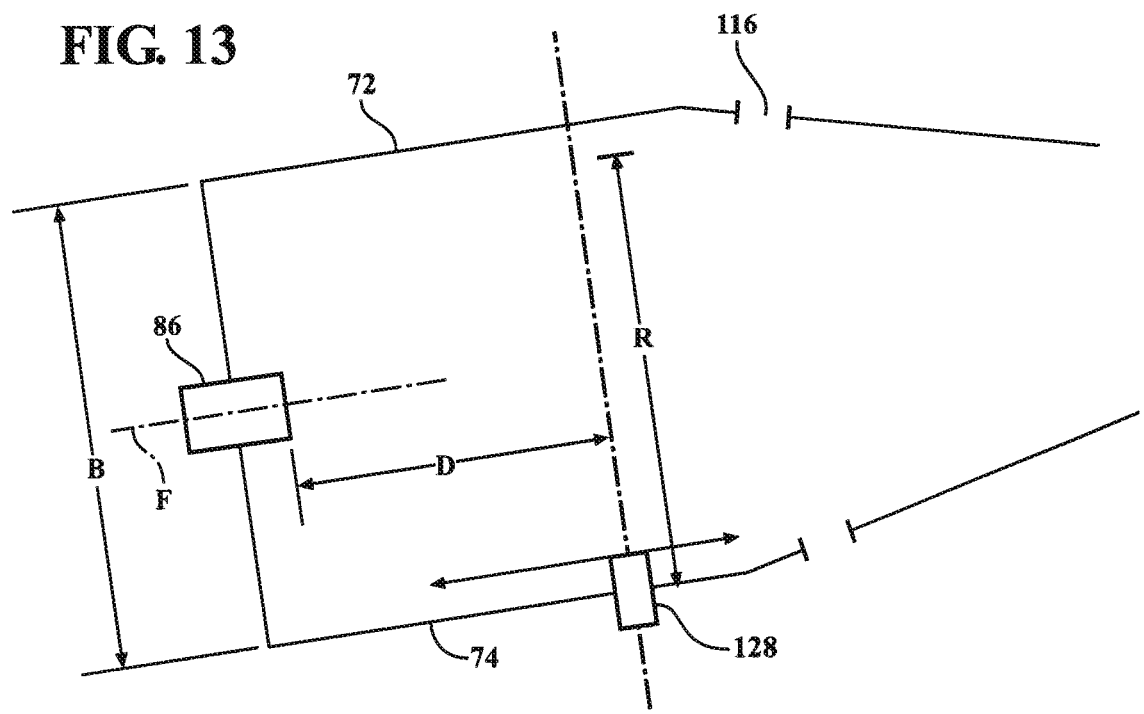
FIG. 13 is a schematic longitudinal sectional view of a combustor which illustrates a relationship between the axial and radial fuel injection systems according to another disclosed non-limiting embodiment.

The multiple of outer fuel nozzles 126 are radially spaced a distance R from the inner fuel nozzles 128 at between about 100%-200% of the bulkhead height B. It should be understood that the distance R may be with respect to the liner panels 72, 74 should the radial main fuel injection system 120 only utilize outer fuel nozzles 126 (FIG. 13) or inner fuel nozzles 128 (FIG. 13).

Figure 14:
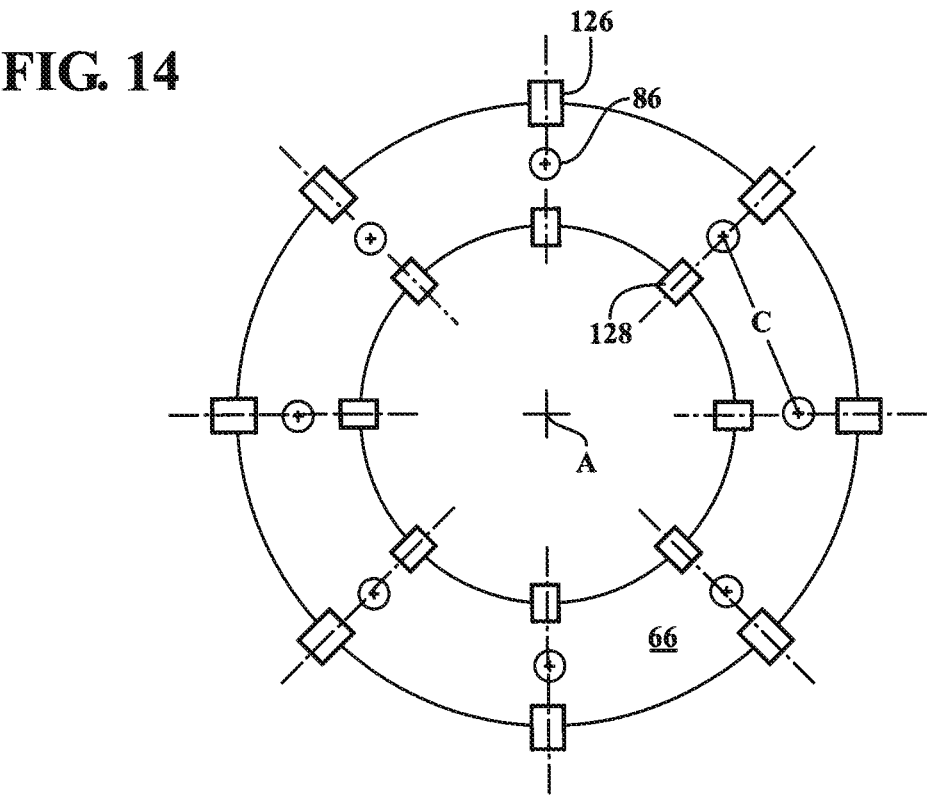
FIG. 14 is a schematic lateral sectional view of a combustor which illustrates a relationship between the axial and radial fuel injection systems according to another disclosed non-limiting embodiment.
Figure 15:
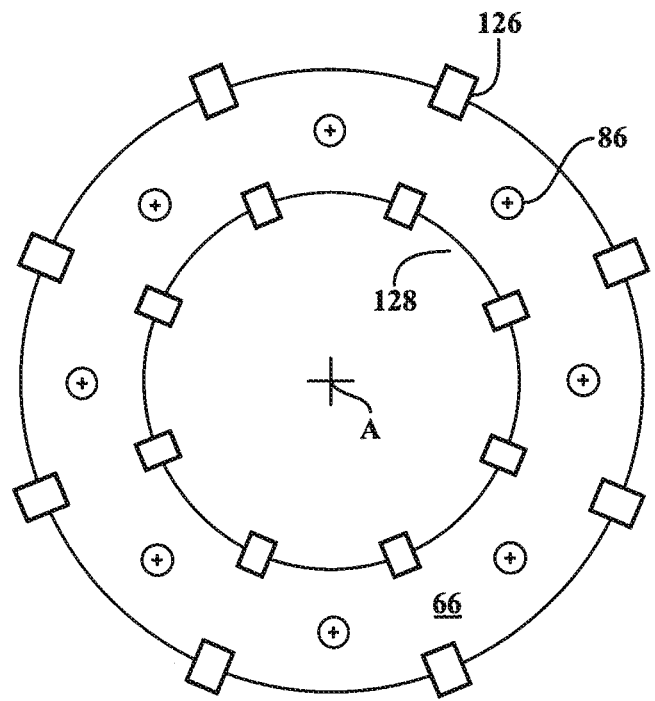
FIG. 15 is a schematic lateral sectional view of a combustor which illustrates a relationship between the axial and radial fuel injection systems according to another disclosed non-limiting embodiment.

With respect to FIG. 14, the multiple of outer fuel nozzles 126 and multiple of inner fuel nozzles 128 may be arranged circumferentially in-line with the forward fuel nozzles 86. Alternatively, the multiple of outer fuel nozzles 126 and multiple of inner fuel nozzles 128 may be arranged circumferentially between the forward fuel nozzles 86 at, for example, quarter pitch (FIG. 15). The multiple of outer fuel nozzles 126 and/or the multiple of inner fuel nozzles 128 may be spaced apart a distance C of between 25%-100% of the bulkhead height B circumferentially, which alternatively, may be defined as about 1.5-5 fuel jet diameters. It should be appreciated that various circumferential and other relationships may be utilized and that fuel jet diameter and bulkhead sizing are but examples thereof.

Figure 16:
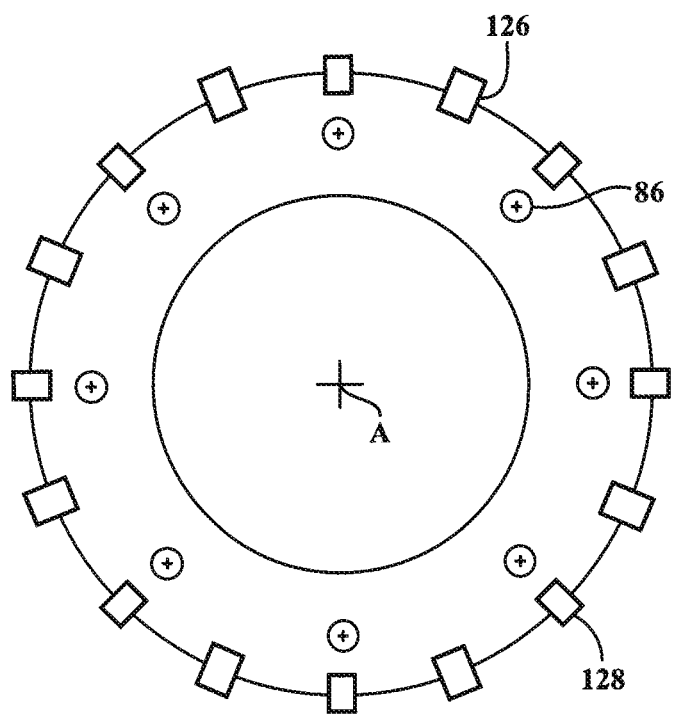
FIG. 16 is a schematic lateral sectional view of a combustor which illustrates the axial and radial fuel injection systems that include a numerically different relationship according to another disclosed non-limiting embodiment.

Alternatively still, with respect to FIG. 16, the multiple of outer fuel nozzles 126 may be more numerous than the forward fuel nozzles 86. In this disclosed non-limiting embodiment, twice the number of outer fuel nozzles 126 as compared to the forward fuel nozzles 86. The multiple of outer fuel nozzles 126 include both in-line and circumferentially distributed forward fuel nozzles 86

Figure 17:
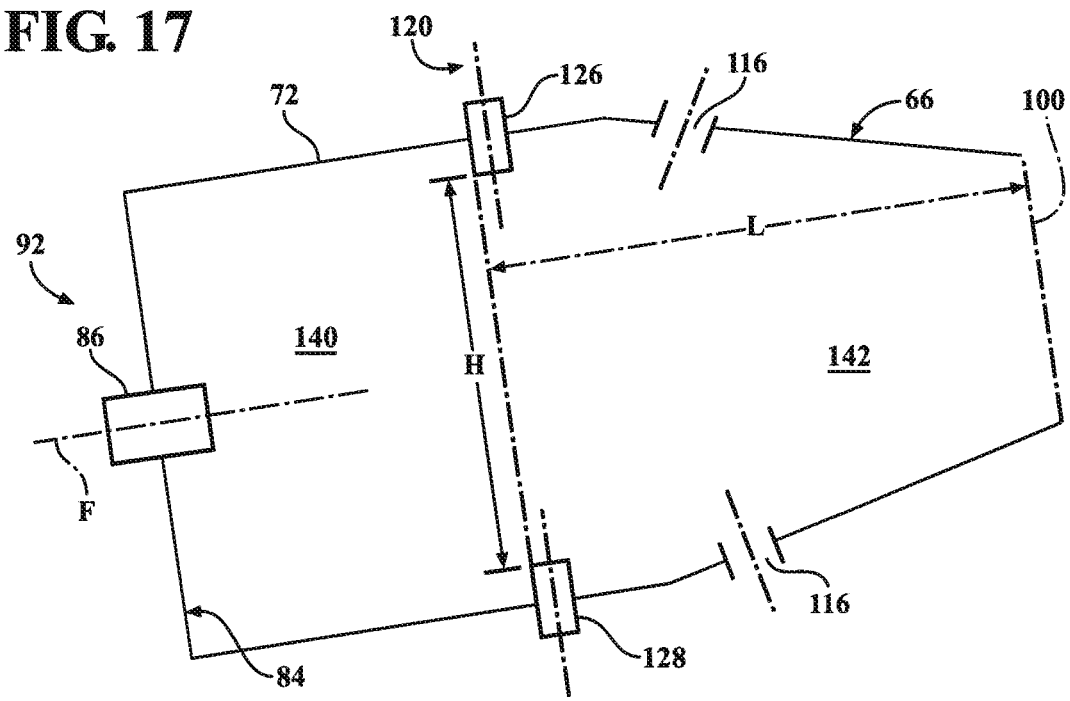
FIG. 17 is a schematic longitudinal sectional view of a combustor which illustrates a relationship between the axial and radial fuel injection systems according to another disclosed non-limiting embodiment.

With reference to FIG. 17, the axial pilot fuel injection system 92, the radial main fuel injection system 120 and the multiple of dilution holes 116 define a forward combustion zone 140 axially between the bulkhead assembly 84 and the forward section of the radial main fuel injection system 120, as well as a downstream combustion zone 142 between the forward section of the radial main fuel injection system 120 and the combustor exit 100. The downstream combustion zone 142 is axially proximate the multiple of dilution holes 116.

In one disclosed non-limiting embodiment, the axial pilot fuel injection system 92 provides about 10%-35% of the combustor airflow, the radial main fuel injection system 120 provides about 30%-60% of combustor airflow while the multiple of dilution holes 116 provide about 5%-20% of the combustor airflow. It should be appreciated that these ranges of combustor airflow may define a total combustor airflow less than 100% with the remainder being cooling airflow. It should be further appreciated that generally as the combustor airflow from the axial pilot fuel injection system 92 increases, the radial main fuel injection system 120 decreases and vice-versa with the balance being from the multiple of dilution holes 116. In one specific example, the axial pilot fuel injection system 92 provides about 20% of the combustor airflow, the radial main fuel injection system 120 provides about 45% of combustor airflow while the multiple of dilution holes 116 provide about 10% of the combustor airflow with the remainder being cooling airflow.

In one disclosed non-limiting embodiment, the forward combustion zone 140 defines about 20% to 50% of the total combustor chamber 66 volume and the downstream combustion zone 142 defines about 50% to 80% of the total combustor chamber 66 volume.

In one disclosed non-limiting embodiment, the downstream combustion zone 142 forms an axial length L of about 100%-250% a height H of the combustion chamber 66 between the liners 72, 74 at the radial main fuel injection system 120 location. The height H as defined herein is the radial distance between the liner panels 72, 74 within the combustion chamber 66 proximate the radial main fuel injection system 120 location. It should be appreciated that various combinations of the above-described geometries may be provided.

Figure 18:
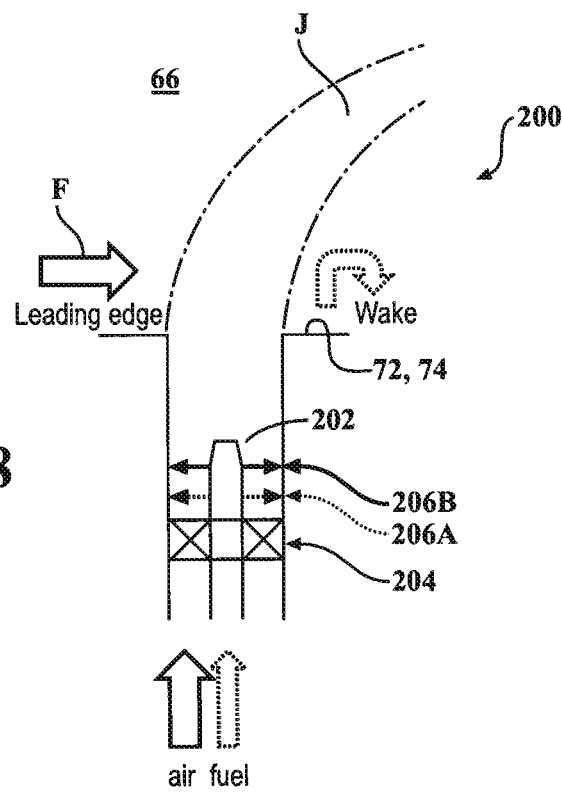
FIG. 18 is a schematic view of a fuel injector of a radial fuel injection system according to one disclosed non-limiting embodiment.

With reference to FIG. 18, one example injector 200 of the radial main fuel injection system 120 includes a fuel nozzle 202 located within a respective swirler 204. It should be appreciated that although one example injector 200 of the radial main fuel injection system 120 is depicted various other injectors may benefit herefrom. The injector 200 introduces a premixed or partially premixed fuel/air jet J into a cross-flow F of hot combustion products created in the upstream pilot region of the combustion chamber 66.

The fuel nozzle 202 includes a multiple of fuel injector orifices 206 that introduce jet fuel into the injector 200. The swirler 204 in this embodiment is an axial swirler with a central fuel nozzle 202.

Figure 20:
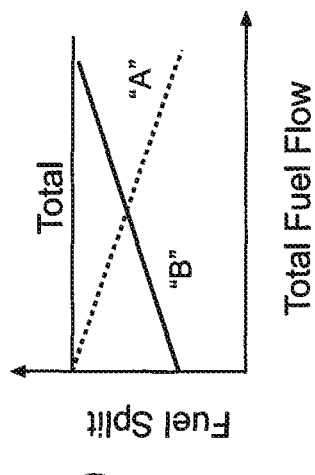
FIG. 20 is a graphical representation of a fuel flow split between a first set of fuel injector orifices and a second set of fuel injector orifices.

In this embodiment, the multiple of fuel injector orifices 206 include a first set of fuel injector orifices 206A and a second set of fuel injector orifices 206B that are located downstream of the first set of fuel injector orifices 206A. The fuel injector orifices 206 are located downstream of the swirler 204 with respect to the combustion chamber 66. The first set of fuel injector orifices 206A and the second set of fuel injector orifices 206B each receive fuel independently from a respective first fuel manifold 208A and second fuel manifold 208B. A fuel divider valve 210 selectively communicates a respective percentage of fuel flow to the first set of fuel injector orifices 206A and the second set of fuel injector orifices 206B (FIG. 20). The fuel divider valve 210 may be a mechanical or electrical flow divider valve to shift the flow between manifolds 208A, 208B to provide a selective flow split between the first set of fuel injector orifices 206A, and the second set of fuel injector orifices 206B (FIG. 20).

Figure 22:
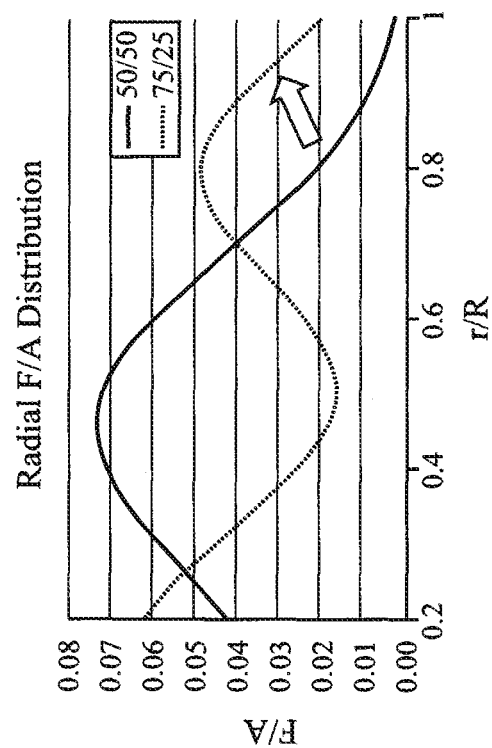
FIG. 22 is a graphical representation of a radial F/A distribution.
Figure 21:
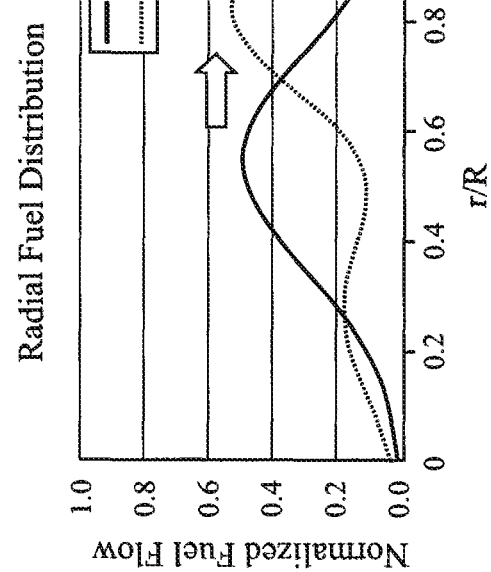
FIG. 21 is a graphical representation of a radial fuel distribution.

With reference to FIGS. 21 and 22, a mixer with a 50/50 design point fuel flow split provides a fuel jet penetration at 55% (0.55 r/R) of swirler radius. Fuel shifting between the first set of fuel injector orifices 206A and the second set of fuel injector orifices 206B can be use to tailor the radial F/A distribution profile at the exit of the swirler 204 in order to anchor the flame (FIG. 22). Shifting fuel split to 75/25 provides a fuel jet penetration of the first set of fuel injector orifices 206A of 0.275 r/R and 0.825 r/R for the second set of fuel injector orifices 206B to move the fuel jet radially outward which results in a shifted radial F/A distribution toward the outer diameter (FIG. 22).

With reference to FIG. 23, in another disclosed non-limiting embodiment, a flameholder 220, such as a V-gutter may be located at the exit of the injector 200. The flameholder 220 may be aligned with the cross-flow F of the hot combustion products from the upstream pilot zone through the combustion chamber 66.

With reference to FIG. 24, in another disclosed non-limiting embodiment, clocking of the first set of fuel injector orifices 206A and the second set of fuel injector orifices 206B may be staggered by ½ the angular hole spacing. That is, the first set of fuel injector orifices 206A and the second set of fuel injector orifices 206B need not be in different axial locations and may be coplanar at the fuel nozzle 202 at a constant axial distance from the swirler 204.

With reference to FIG. 25, in another disclosed non-limiting embodiment, one or more, or each, of the first set of fuel injector orifices 206A, and the second set of fuel injector orifices 206B may be clocked to compensate for the swirl within the swirler 204. That is, the fuel injection location is clocked at an injection direction such that the fuel-enriched region is rotated by the swirl generated by the swirler 204 and the partially premixed fuel/air jet J directed into the cross-flow F of hot combustion products is clocked to a desired resultant location at the swirler exit. The injection direction is rotated as required to account for swirl such as, for example, by 80 degree clockwise to account for 80 degree counter-clockwise rotation of the flow from the injector to the swirler exit. The fuel injector orifices may be clocked to, for example, enrich the jet leading edge (FIG. 25), or to enrich the jet wake (FIG. 26). The fuel injector orifices may alternatively be clocked to be aligned with the flameholder 220 to enrich the flameholder wake (FIG. 27).

Figure 19:
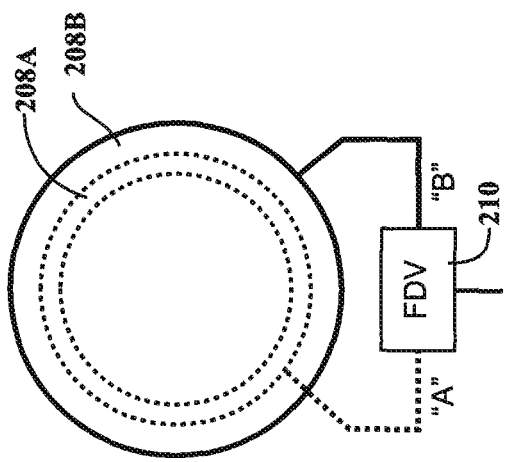
FIG. 19 is a schematic view of a fuel manifold for a first set of fuel injector orifices and a second set of fuel injector orifices.
Figure 28:
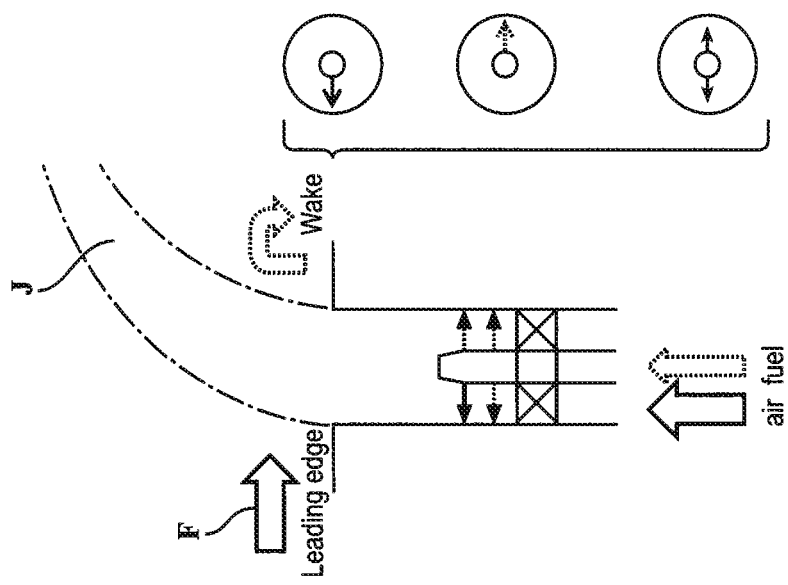
FIG. 28 is a schematic view of a fuel orifice arrangement according to one disclosed non-limiting embodiment.

With reference to FIG. 28, in another disclosed non-limiting embodiment, the first set of fuel injector orifices 206A and the second set of fuel injector orifices 206B receive fuel independently from the respective first fuel manifold 208A and the second fuel manifold 208B (FIG. 19). That is, of six (6) total fuel injector orifices, the first set of fuel injector orifices 206A may include five (5) injectors that each receive a first fuel flow while the second set of fuel injector orifices 206B may include one (1) injector that receives a second fuel flow to provide a fuel bias to enrich particular circumferential locations of the reacting jet in the cross-flow at a desired circumferential location. In this embodiment, the sets of fuel injector orifices are defined by a particular number of orifices at a common radial position with respect to the swirler. The particular fuel biasing injectors do not have to be in a separate axial location within swirler 204 and can be co-located axially as one or two of the typically six injectors that are arranged circumferentially.

Figure 29:
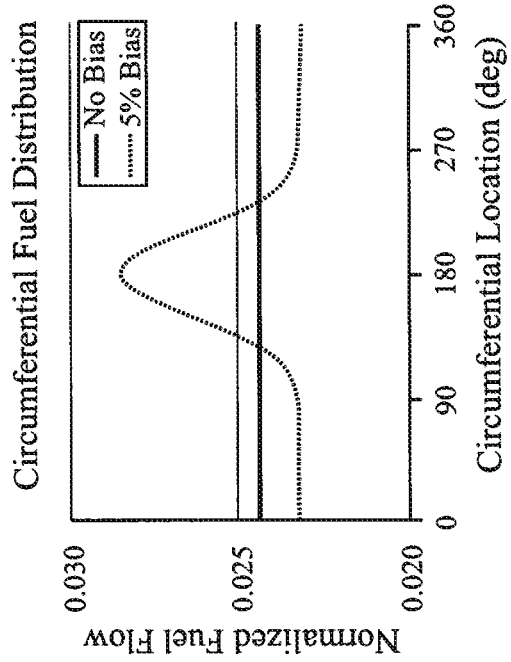
FIG. 29 is a graphical representation of an example circumferential fuel distribution.
Figure 30:
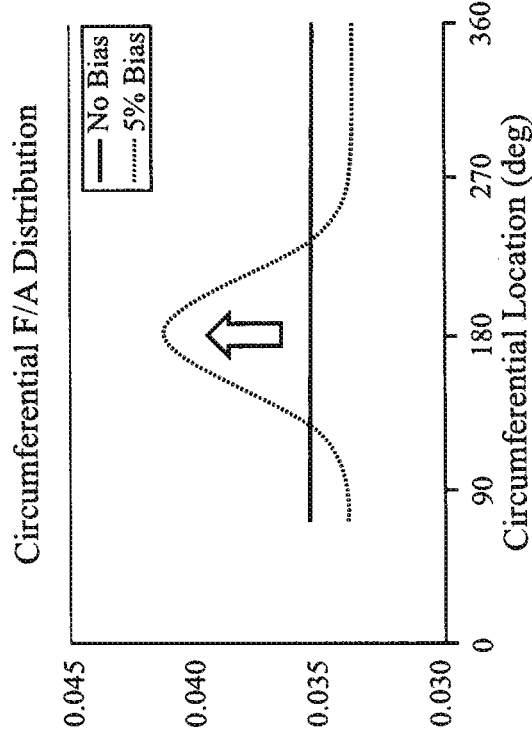
FIG. 30 is a graphical representation of an example circumferential F/A distribution.

With reference to FIGS. 29 and 30, an example nominal uniform fuel distribution is provided to six (6) fuel injection orifices, each with 1/6=17% of total flow. For example, by biasing fuel flow as follows: 79% to five (5) injectors (16% each) and 21% to one (1) injector (16+5=21%; a 5% bias) an increased fuel flow to one injector by +5% increases the F/A at a desired circumferential location. That is, the Fuel/Air Ratio is significantly increased at targeted circumferential location.

The injector 200 provides for stable and robust anchoring/flameholding of the main zone reacting jet, which facilitates mitigation of combustion dynamics, improved dynamic stability, and prevention of intermittent flame lift-off. Local fuel enrichment at the outer diameter of the swirler 204 exit enhances flameholding. Local fuel enrichment at leading edge, and/or in the wake of jet, and/or aligned with the flameholder at the swirler exit will enhance flameholding. Fuel shifting or fuel biasing can be used to create a richer F/A mixture at a specific location where the flame anchoring is desired. Fuel shifting and fuel biasing for a liquid-fueled aero engine axially-staged lean-lean combustor configuration may be provided by radial fuel re-distribution within the swirler, and/or non-uniform circumferential distribution within or with respect to the swirler.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. An injector for a combustor of a gas turbine engine comprising:
    a swirler;
    a fuel nozzle located within the swirler, the fuel nozzle comprising a multiple of fuel injector orifices, the multiple of fuel injector orifices comprises a first set of fuel injector orifices and a second set of fuel injector orifices in the fuel nozzle to provide a biased fuel distribution to fuel enrich a location with respect to an exit diameter of the swirler, wherein the first set of fuel injector orifices and the second set of fuel injector orifices are located downstream of the swirler;
    a first fuel manifold in communication with the first set of fuel injector orifices and a second fuel manifold in communication with the second set of fuel injector orifices; and
    a fuel divider valve that selectively communicates a respective percentage of fuel flow to the first set of fuel injector orifices and the second set of fuel injector orifices to provide a selective flow split between the first set of fuel injector orifices and the second set of fuel injector orifices.

2. The injector as recited in claim 1, wherein the second set of fuel injector orifices are downstream of the first set of fuel injector orifices with respect to the swirler to provide a biased radial fuel distribution to fuel enrich a radial location with respect to an exit diameter of the swirler.

3. The injector as recited in claim 1, wherein the first set of fuel injector orifices and the second set of fuel injector orifices are located at a common axial position with respect to the swirler.

4. A method for injecting fuel into a combustor of a gas turbine engine, comprising:
   tailoring a fuel air distribution profile within a swirler with an injector comprising a first set of fuel injector orifices and a second set of fuel injector orifices; and
   selectively communicating a respective percentage of fuel flow through a fuel divider valve to the first set of fuel injector orifices and the second set of fuel injector orifices to provide a selective flow split between the first set of fuel injector orifices and the second set of fuel injector orifices to provide a biased fuel distribution to fuel enrich a location with respect to an exit diameter of the swirler, wherein the first set of fuel injector orifices and the second set of fuel injector orifices are downstream of the swirler.

5. The method as recited in claim 4, wherein the biased fuel distribution within the swirler provides a fuel enriched bias to fuel enrich an outer portion of the jet with respect to an exit diameter of the swirler.

6. The method as recited in claim 4, wherein the biased fuel distribution within the swirler provides a fuel enriched bias to fuel enrich a jet leading edge with respect to a cross-flow of hot combustion products from an upstream pilot zone.

7. The method as recited in claim 4, wherein the biased fuel distribution within the swirler provides a fuel enriched bias to fuel enrich a wake with respect to a cross-flow of hot combustion products from an upstream pilot zone.

8. The method as recited in claim 4, wherein the biased radial fuel distribution within the swirler provides a fuel enriched bias with respect to a flameholder.

9. The method as recited in claim 4, wherein the selective flow split is shifted to 50/50.

10. The method as recited in claim 4, wherein the selective flow split is shifted to 75/25.

11. The method as recited in claim 4, wherein the selective flow split is shifted to anchor the flame.

12. The method as recited in claim 4, wherein the selective flow split is shifted to move the fuel jet outward.

13. The method as recited in claim 4, further comprising tailoring a radial fuel air distribution profile within the swirler, wherein tailoring the radial fuel air distribution profile comprises fuel shifting between the first set of fuel injector orifices and the second set of fuel injector orifices the second set of fuel injector orifices downstream of the first set of fuel injector orifices with respect to the swirler.

14. The method as recited in claim 13, wherein tailoring the radial fuel air distribution profile comprises shifting the fuel to provide a fuel jet penetration of the first set of fuel injector orifices of 27.5% of combustor radius and 82.5% of combustor radius for the second set of fuel injector orifices.

15. The method as recited in claim 4, further comprising tailoring a circumferential fuel air distribution profile within a swirler, wherein tailoring the circumferential fuel air distribution profile comprises fuel shifting between the first set of fuel injector orifices and the second set of fuel injector orifices.

16. The method as recited in claim 15, wherein the first set of fuel injector orifices and the second set of fuel injector orifices are located at a common axial position with respect to the swirler.

17. A method for injecting fuel into a combustor of a gas turbine engine, comprising:
   tailoring a fuel air distribution profile within a swirler with an injector comprising a first set of fuel injector orifices and a second set of fuel injector orifices; and
   selectively communicating a respective percentage of fuel flow through a fuel divider valve to the first set of fuel injector orifices and the second set of fuel injector orifices to provide a selective flow split between the first set of fuel injector orifices and the second set of fuel injector orifices to provide a biased fuel distribution to fuel enrich a location with respect to an exit diameter of the swirler, wherein the biased fuel distribution provides:
   a fuel enriched bias to fuel enrich a jet leading edge with respect to a cross-flow of hot combustion products from an upstream pilot zone, or
   a fuel enriched bias to fuel enrich a wake with respect to a cross-flow of hot combustion products from the upstream pilot zone.

* * * * *